(12) United States Patent
Koga

(10) Patent No.: US 9,996,947 B2
(45) Date of Patent: Jun. 12, 2018

(54) MONITORING APPARATUS AND MONITORING METHOD

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/249,441

(22) Filed: Apr. 10, 2014

(65) Prior Publication Data

US 2014/0375685 A1    Dec. 25, 2014

(30) Foreign Application Priority Data

Jun. 21, 2013   (JP) ................................. 2013-130621

(51) Int. Cl.
  *G06T 11/60*   (2006.01)
  *G06T 11/00*   (2006.01)
  *G06Q 10/06*   (2012.01)

(52) U.S. Cl.
  CPC .......... *G06T 11/00* (2013.01); *G06Q 10/0631* (2013.01)

(58) Field of Classification Search
  None
  See application file for complete search history.

(56) References Cited

U.S. PATENT DOCUMENTS

| 6,295,367 B1 * | 9/2001 | Crabtree | G01S 3/7865 |
| | | | 382/103 |
| 6,928,384 B2 * | 8/2005 | Kochi | G06T 7/0075 |
| | | | 348/E13.008 |
| 7,023,469 B1 * | 4/2006 | Olson | H04N 7/188 |
| | | | 348/143 |

(Continued)

FOREIGN PATENT DOCUMENTS

| JP | 2006-92530 | 4/2006 |
| JP | 2007-323141 | 12/2007 |

(Continued)

OTHER PUBLICATIONS

Office Action dated Feb. 14, 2017 in Japanese Patent Application No. 2013-130621 (with unedited computer generated English translation).

*Primary Examiner* — Barry Drennan
*Assistant Examiner* — Jason Pringle-Parker
(74) *Attorney, Agent, or Firm* — Oblon, McClelland, Maier & Neustadt, L.L.P.

(57) ABSTRACT

This disclosure describes an information processing apparatus including a processor configured to acquire first image data, detect reference image data of a particular object from the first image data, store first time information indicating a first time when the reference image data is detected from the first image data or when the first image data is captured, acquire second image data, generate, when another reference image data of another particular object is detected from the second image data, second time information indicating a (Continued)

second time when the another reference image data is detected from the second image data or when the second image data is captured, generate movement information based on a difference between the first time information and the second time information, and determine whether a work is implemented in a place where the work has to be implemented.

17 Claims, 20 Drawing Sheets

(56) References Cited

U.S. PATENT DOCUMENTS

| | | | | |
|---|---|---|---|---|
| 8,059,897 B2* | 11/2011 | Xu | | H04M 1/72522 |
| | | | | 345/581 |
| 8,860,760 B2* | 10/2014 | Chen | | G09G 5/397 |
| | | | | 345/633 |
| 9,489,399 B1* | 11/2016 | Laporte | | G06F 17/30241 |
| 9,600,443 B2* | 3/2017 | Albano | | G06K 9/00369 |
| 2002/0141637 A1* | 10/2002 | Brodsky | | G06K 9/00771 |
| | | | | 382/165 |
| 2004/0183751 A1 | 9/2004 | Dempski | | |
| 2007/0118739 A1 | 5/2007 | Togashi et al. | | |
| 2007/0189585 A1* | 8/2007 | Sukegawa | | G06K 9/00221 |
| | | | | 382/118 |
| 2007/0230798 A1* | 10/2007 | Naylor | | G08B 13/1961 |
| | | | | 382/219 |
| 2008/0310686 A1 | 12/2008 | Kretz | | |
| 2010/0225765 A1* | 9/2010 | Kadogawa | | H04N 7/181 |
| | | | | 348/159 |
| 2011/0115816 A1* | 5/2011 | Brackney | | G06Q 10/06 |
| | | | | 345/629 |
| 2011/0134108 A1* | 6/2011 | Hertenstein | | G06T 19/006 |
| | | | | 345/419 |
| 2011/0279697 A1* | 11/2011 | Shingu | | H04N 5/2621 |
| | | | | 348/222.1 |
| 2012/0116728 A1* | 5/2012 | Shear | | G06F 17/50 |
| | | | | 703/1 |
| 2013/0100165 A1 | 4/2013 | Komiyama | | |
| 2013/0293586 A1* | 11/2013 | Kaino | | G08G 1/005 |
| | | | | 345/633 |
| 2015/0363647 A1* | 12/2015 | Perez | | G06K 9/00671 |
| | | | | 345/633 |

FOREIGN PATENT DOCUMENTS

| | | |
|---|---|---|
| JP | 2010-531089 | 9/2010 |
| JP | 2012-226663 | 11/2012 |
| JP | 2013-92887 A | 5/2013 |
| WO | WO 2005/119539 A1 | 12/2005 |

* cited by examiner

FIG. 8

$$E = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 9

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 10

| CONTENT ID | MARKER ID | TEMPLATE ID | POSITION COORDINATES | ROTATION COORDINATES | SCALE FACTOR INFORMATION | ATTACHED INFORMATION |
|---|---|---|---|---|---|---|
| C1 | MA | T1 | (X1m,Y1m,Z1m) | (P1m,Q1m,R1m) | (J1x,J1y,J1z) | (1) CONFIRM THAT THE VALVE IS CLOSED |
| C2 | MA | T1 | (X2m,Y2m,Z2m) | (P2m,Q2m,R2m) | (J2x,J2y,J2z) | (2) RECORD THE VALUE OF THE SENSOR |
| C3 | MA | T3 | (X3m,Y3m,Z3m) | (P3m,Q3m,R3m) | (J3x,J3y,J3z) | (3) TO THE ADJOINING ROOM |
| C4 | MB | T4 | (X4m,Y4m,Z4m) | (P4m,Q4m,R4m) | (J4x,J4y,J4z) | - |
| ... | ... | ... | ... | ... | ... | ... |

Columns POSITION COORDINATES, ROTATION COORDINATES, SCALE FACTOR INFORMATION are grouped as POSITION INFORMATION.

FIG. 11

| TEMPLATE ID | | | T1 | |
|---|---|---|---|---|
| VERTEX COORDINATES | | 0 | (0, 0, 0) | T11 |
| | | 1 | (X3m, Y3m, Z3m) | |
| | | 2 | (X4m, Y4m, Z4m) | |
| | | 3 | (X5m, Y5m, Z5m) | |
| | | 4 | (X6m, Y6m, Z6m) | |
| | | 5 | ... | |
| | | 6 | ... | |
| | | 7 | ... | |
| | | ... | ... | |
| 1 | VERTEX ORDER | | 1, 3, 4, 5, 7 | T12 |
| | TEXTURE ID | | 21 | |
| 2 | VERTEX ORDER | | 2, 3, 4, 5, 6 | |
| | TEXTURE ID | | 21 | |
| ... | VERTEX ORDER | | ... | |
| | TEXTURE ID | | ... | |

FIG. 12

| RECOGNIZED MARKER ID | IMMEDIATELY PRIOR RECOGNIZED MARKER ID | TIME CONDITION (min) |
|---|---|---|
| MA | Null | Null |
| MB | MA | 7 |
| MC | MB | 5 |

FIG. 13

| RECOGNIZED MARKER ID \ IMMEDIATELY PRIOR RECOGNIZED MARKER ID | MC | MD | ME | MF |
|---|---|---|---|---|
| MD | 10 | Null | 3 | 10 |
| ME | 12 | 3 | Null | 10 |
| MF | 5 | 10 | 10 | Null |

FIG. 14

| MARKER ID | RECOGNIZED TIME |
|---|---|
| MA | 2013/5/1 13:00:00 |
| MB | |
| MC | |
| MD | |
| ME | |
| MF | |

MONITORING APPARATUS AND MONITORING METHOD

CROSS-REFERENCE TO RELATED APPLICATION

This application is based upon and claims the benefit of priority of the prior Japanese Patent Application No. 2013-130621, filed on Jun. 21, 2013, the entire contents of which are incorporated herein by reference.

FIELD

The embodiments discussed herein are related to technology for determining implementation of work.

BACKGROUND

Model data of a three-dimensional object disposed in three-dimensional virtual space corresponding to real space is displayed in a manner superimposed on a photographed image captured by an imaging apparatus. This technology augments information collected by a human perception (such as vision), and is accordingly referred to as augmented reality (AR) or the like. The model data of a three-dimensional object disposed in three-dimensional virtual space corresponding to real space is referred to as an AR content.

A projection image of the AR content of which the position on virtual space corresponding to real space is set, is displayed in a manner superimposed on a photographed image based on the position on virtual space. Note that the projection image of the AR content is further generated based on a positional relation between an imaging apparatus and the AR content.

In order to determine a positional relation between the imaging apparatus and the AR content, a reference object is employed. For example, an AR marker is generally employed as the reference object. Specifically, upon an AR marker being detected from a photographed image photographed by the imaging apparatus, the positional relation between the AR marker and the imaging apparatus is determined based on an image of the AR marker reflected in the photographed image of the imaging apparatus. The projection image of the AR content corresponding to the AR marker is displayed in a manner superimposed on the photographed image in which the positional relation is reflected. For example, there are disclosed techniques relating to Japanese National Publication of International Patent Application No. 2010-531089, and International Publication Pamphlet No. WO 2005-119539. AR technology has recently been employed for various fields. For example, AR technology is employed for a system supporting a worker who performs work within a facility.

On the other hand, there is technology using an IC tag to determine the legitimacy of a worker performing work. For example, there is an entrance and exit management server configured to determine the legitimacy of an IC-tag holder, based on position and time and so forth at the time of reading the IC tag. An example of this entrance and exit management server is disclosed in Japanese Laid-open Patent Publication No. 2007-323141. This entrance and exit management server outputs an alarm regarding whether or not an IC-tag holder is in an appropriate workplace. This determination is made based on determination regarding whether or not the number of a gate which has read the IC tag is included in the number of a reading gate installed in a workplace associated with a user who possesses this IC tag. Also, the entrance and exit management server calculates the duration of the worker's stay, and also determines the legitimacy of the worker based on whether or not the duration of the stay is normal.

SUMMARY

According to an aspect of the invention, an information processing apparatus includes: a memory; and a processor coupled to the memory and configured to: acquire first image data, generate, when second image data of a particular object is included in the first image data, movement information regarding a position where an image corresponding to the first image data is photographed, and control execution of processing according to execution or inexecution of work in a place where the work has to be executed, according to a determination result regarding whether or not the movement information satisfies a certain condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a transform matrix from the AR marker coordinate system to the camera coordinate system, and a rotation matrix with the transform matrix;

FIG. 9 illustrates rotation matrices;

FIG. 10 is a diagram illustrating a data structure example of an AR content information table;

FIG. 11 illustrates a data structure example of a template information table;

FIG. 12 illustrates a first data structure example of a condition information table;

FIG. 13 illustrates a second data structure example of the condition information table;

FIG. 14 is a diagram illustrating a data structure example of a log information table;

DESCRIPTION OF EMBODIMENTS

In a case of a worker supporting system using augmented reality (AR) technology, a worker photographs an AR marker installed in a workplace within a facility using a terminal device including an imaging apparatus, for example. Upon recognizing the AR marker included in the photographed image, the terminal device displays a projection image of an AR content associated with the AR marker on a superimposed image disposed on the photographed image.

Examples of the AR content in the supporting system include model data of a three-dimensional object relating to instructions for work contents, work history in the past, notes, and so forth. The worker performs work while viewing display contents of the AR content within the superimposed image, so the supporting system may reduce the work burden placed on the worker.

Here, it is important to confirm whether or not work by the worker is actually being performed, for various types of work. For example, in a case of an existing entrance and exist management server, when a fixed gate is installed in a specified place, determination may be made whether or not the worker is performing work in an unauthorized place, and so forth. However, a fixed gate which reads IC tags has to be provided to each workplace in this case.

An aspect of the technology disclosed in embodiments determines whether or not work has actually been implemented in a workplace.

First Embodiment

Figure 1:
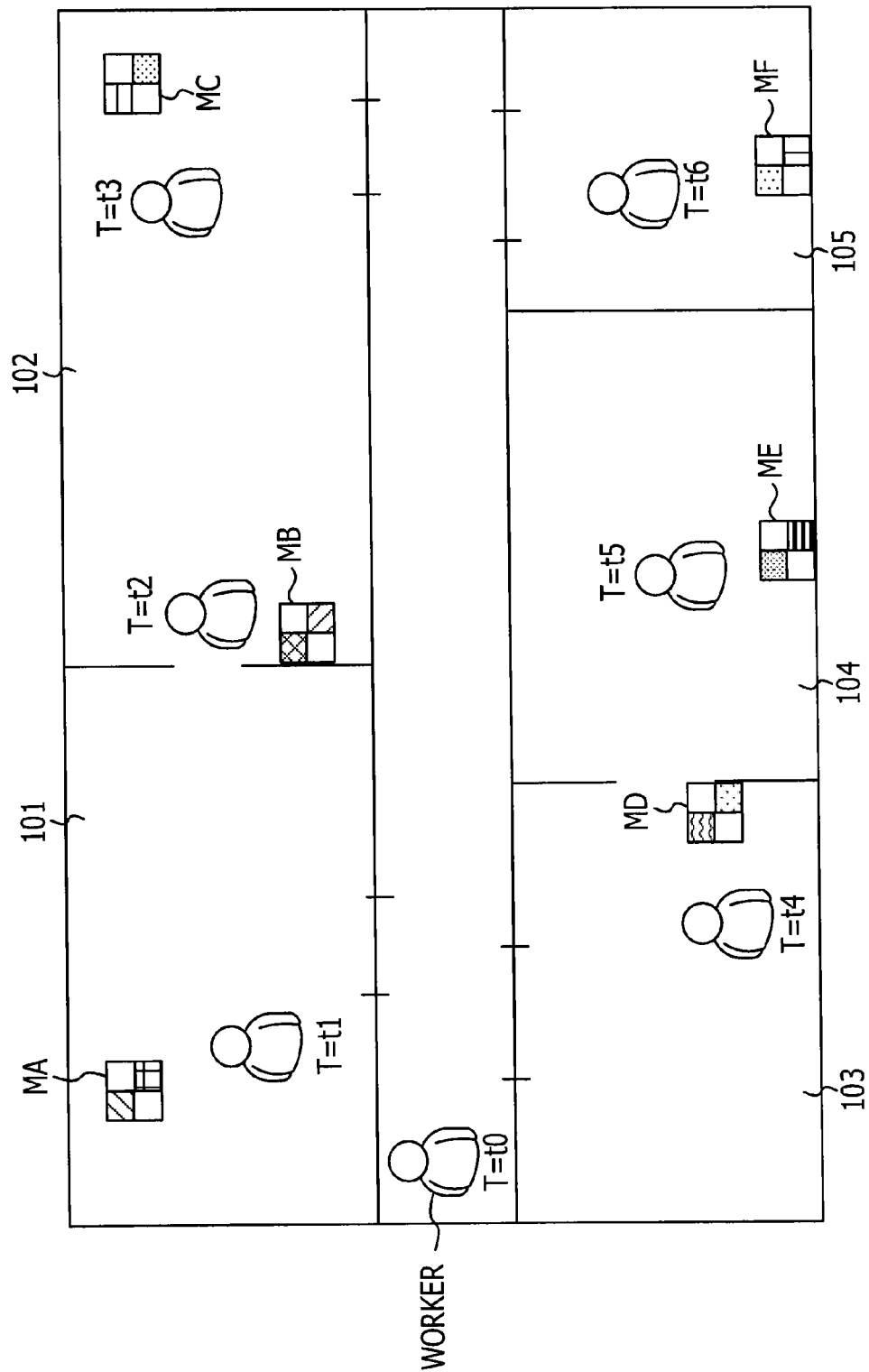
FIG. 1 is a conceptual diagram for describing check work using augmented reality (AR) technology.

The present embodiment will be described with check work at a facility as an example. First, FIG. 1 is a conceptual diagram for describing check work using AR technology.

Let us say that a worker starts check work at time T=t0. First, the worker performs work regarding equipment installed in a room 101 within a facility. At this time, the worker photographs an AR marker MA installed in the room 101 using an information processing apparatus. The information processing apparatus is a communication terminal device including a camera, such as a smartphone, tablet PC, cellular phone, or the like, for example. Note that details of various types of information at the information processing apparatus will be described later.

Also, it is desirable that the AR marker MA is installed in the vicinity of a work object in check work to be implemented within the room 101. Specifically, the AR marker MA is installed in a workplace or in the proximity thereof. For example, the AR marker MA is appended to equipment serving as a work object. Note that, when the AR marker MA, AR marker MB, AR marker MC, AR marker MD, AR marker ME, and AR marker MF illustrated in FIG. 1 do not have to be distinguished, these will be collectively referred to as AR marker M.

The AR marker M is a reference object for determining a positional relation between the information processing apparatus and the AR content. An AR content to be displayed in a manner superimposed on a photographed image is associated with the AR markers M. Accordingly, an AR content corresponding to an AR marker M read by the information processing apparatus is displayed in a manner projected on the photographed image. Here, since the illustrated AR markers MA to MF have mutually different shapes, the information processing apparatus is capable of recognizing the AR markers MA to MF from each other.

Figure 2:
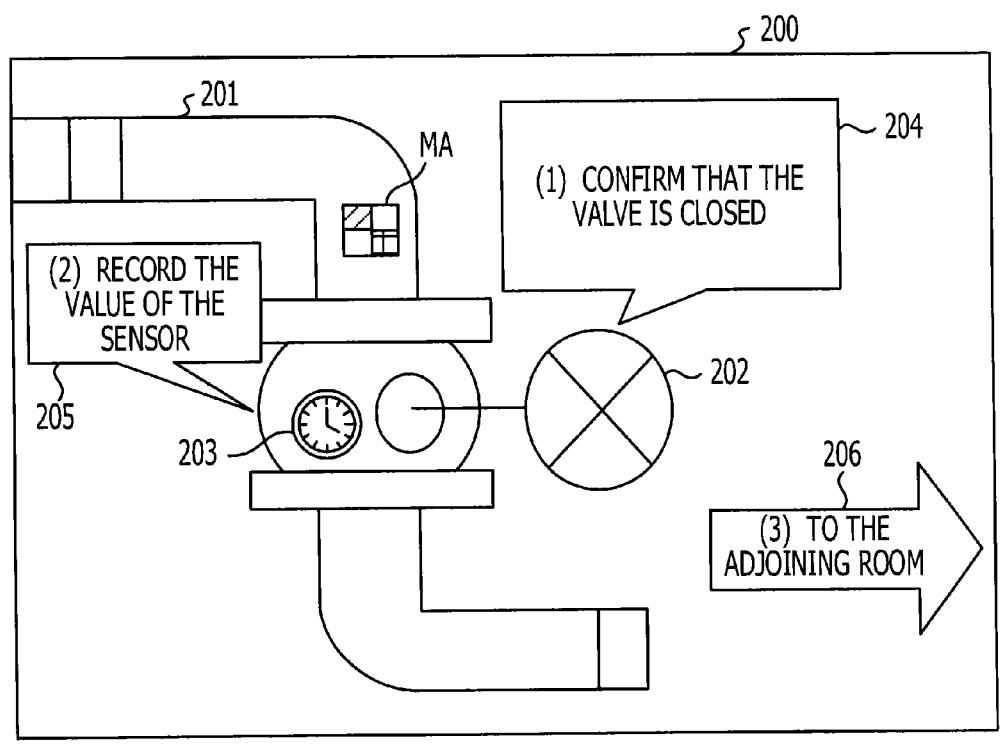
FIG. 2 is a conceptual diagram of a superimposed image.

Now, FIG. 2 is a conceptual diagram of a superimposed image. The superimposed image is an image where a photographed image including an AR marker M is displayed in a manner superimposed with a projection image of the AR content corresponding to this AR marker.

For example, let us say that a worker has photographed a place where the AR marker MA is installed using the information processing apparatus in the room 101 in FIG. 1. At this time, the information processing apparatus performs later-described processing to generate a superimposed image 200 where the projection image of the AR content corresponding to the AR marker MA has been superimposed on the photographed image. The information processing apparatus displays the superimposed image 200 on a display device (e.g., display).

In the case of the example in FIG. 2, the AR marker MA is appended to a pipe 201. There are the pipe 201, a valve 202, a sensor 203, and an AR marker MA in real space. An AR content projection image 204, AR content projection image 205, and AR content projection image 206 are displayed in a manner superimposed on a photographed image obtained by photographing this real space in the superimposed image 200.

Specifically, in the case of the example in FIG. 2, three AR contents are associated with the AR marker MA. Note that a position in the AR marker coordinate system with the AR marker MA as the center is set to the AR contents beforehand. Accordingly, after a position in the marker coordinate system set beforehand as to an AR content three-dimensional model is transformed according to a positional relation between the information processing apparatus and the AR marker MA, the three-dimensional model is projected on the photographed image. Note that generation of a superimposed image including coordinate transform and so forth will be described later.

Accordingly, the worker who has viewed the superimposed image 200 may recognize what kind of work has to be performed next in the room 101. For example, upon viewing (1) CONFIRM THAT THE VALVE IS CLOSED in the AR content projection image 204, the worker understands that he/she has to confirm that the valve 202 is closed. Further, upon viewing (2) RECORD THE VALUE OF THE SENSOR in the AR content projection image 205, the worker understands that he/she has to record the value of a sensor 203. At this time, the worker records the value of the sensor 203 in the information processing apparatus or check list.

Finally, upon viewing (3) TO THE ADJOINING ROOM in the AR content projection image 206, the worker understands that he/she has to complete the work in the room 101 and to move to the room on the right side. Thus, the worker may view the superimposed image by photographing the AR markers M, and may recognize work contents from the AR content projection image displayed on the superimposed image.

As described above, applying the AR technology to various types of work such as check work and so forth allows the worker to recognize work contents as to each work object after recognizing work objects in real space, and accordingly allows the worker to accurately readily recognize the work contents.

Returning to FIG. 1, when a plurality of work tasks have to be completed, the worker goes to the places where each work object exists (room 101, room 102, room 103, room 104, and room 105), and photographs the AR marker M installed in each place. The worker implements work relating to a work object in each place in accordance with the AR content associated with each AR marker M. The example in FIG. 1 illustrates an example in which the worker has implemented work in order of time t0, t1, t2, t3, t4, t5, and t6.

As described above, since an AR content projection image is displayed by the information processing apparatus recognizing the AR marker, there is a possibility that fraud such as described below will be performed.

Figure 3:
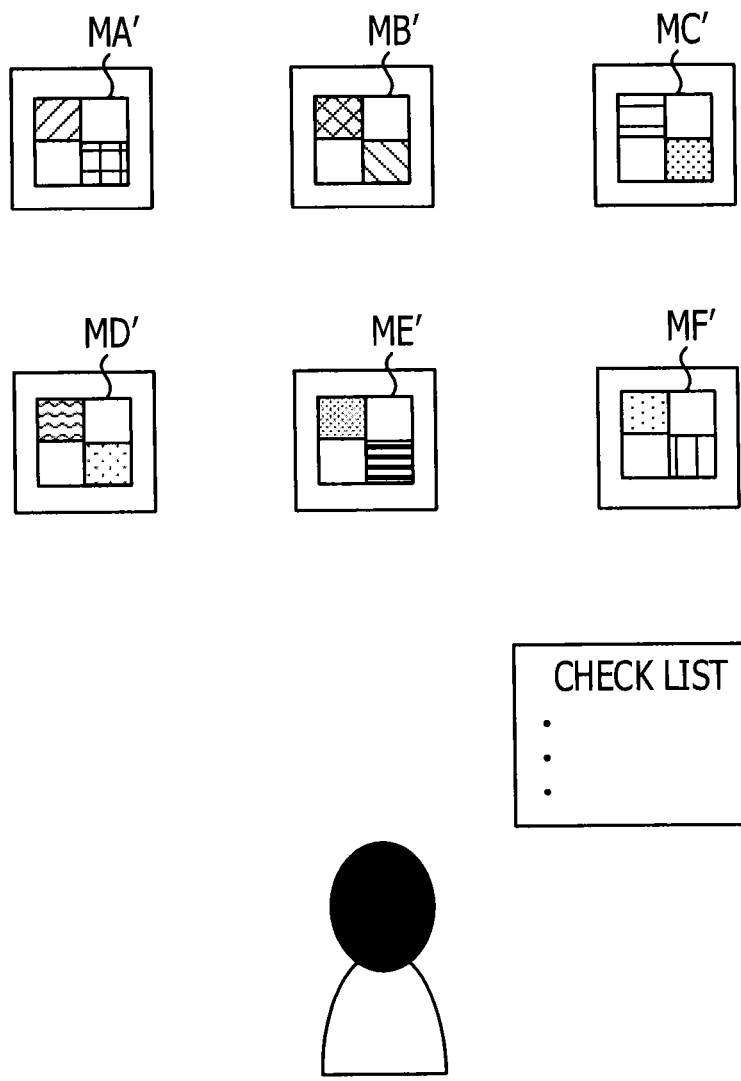
FIG. 3 is a diagram for describing an example of unauthorized faking of implementation of work.

FIG. 3 is a diagram for describing an example of unauthorized faking of implementation of work. The worker makes an unauthorized copy of an AR marker installed in the vicinity of a workplace to generate a copied AR marker. Note that the workplace is a place where a work object exists, or the proximity thereof. In the case of the example in FIG. 2, the workplace is the in the proximity of where the valve 202 and sensor 203 to be worked on exist.

The worker obtains copied AR marker MA', AR marker MB', AR marker MC', AR marker MD', AR marker ME', and AR marker MF' by copying the AR marker MA, AR marker MB, AR marker MC, AR marker MD, AR marker ME, and AR marker MF. Note that the AR marker MA and copied AR marker MA' have the same shape, and have the same recognition result by the information processing apparatus.

The worker photographs the copied AR markers in another place using the information processing apparatus without proceeding to the proper places. The worker may recognize work contents from an AR content projection image displayed in response to recognition of an AR marker, and fake implementation of the work. For example, in a case of work contents to (1) CONFIRM THAT THE VALVE IS CLOSED, the worker inputs "Valve closed" to the check list or information processing apparatus without actually confirming the open or closed state of the valve. Also, in a case of work contents to (2) RECORD THE VALUE OF THE SENSOR, the worker fills an appropriate value therein without actually confirming the value.

As described above, since the AR markers are recognized from a photographed image, copying is relatively easy different from a fixed gate in the entrance and exit management system described in the background art. For example, when a bar-code is employed as an AR marker, further copying an image of the bar-code allows the imaging apparatus to photograph the bar-code in places other than the workplace. Also, even if the AR marker is a particular object, additionally preparing an image of this particular object allows the worker to readily obtain a copy of the AR marker.

Accordingly, execution control of processing according to recognition of the reference object is performed according to a condition regarding a photographed position of an input image in working support using the AR technology in the present embodiment. That is to say, implementation of work is estimated according to a condition regarding a photographed position of an input image. Note that it may be conceived that AR markers are excessively consecutively photographed in the workplace as an example of faking implementation of work other than the example in FIG. 3, for example.

Figure 4:
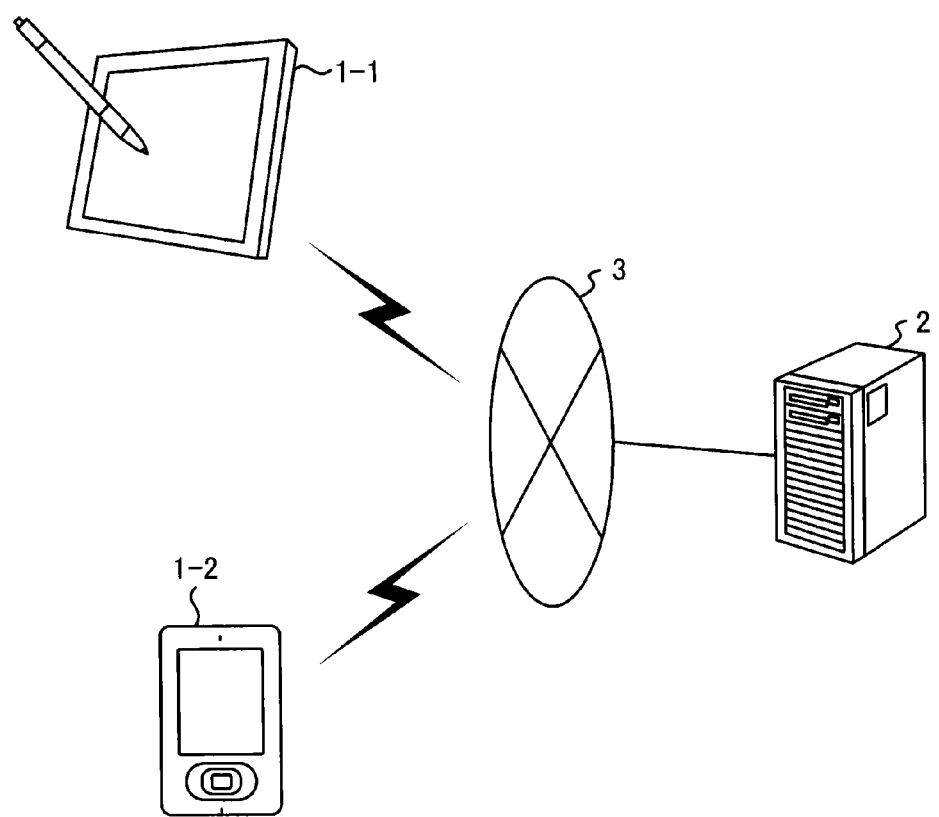
FIG. 4 is a system configuration diagram.

FIG. 4 is a system configuration diagram. The example in FIG. 4 illustrates communication terminals 1-1 and 1-2 as examples of the information processing apparatus. Hereinafter, these are will be referred to generically as information processing apparatus 1. Further, the information processing apparatus 1 communicates with a management apparatus 2 via a network N. The management apparatus 2 is, for example, a server computer, and manages the information processing apparatus 1. The network N is, for example, the Internet. Note that a supporting system according to the present embodiment includes the information processing apparatus 1 and management apparatus 2.

Now, a functional configuration of the management apparatus 2 will roughly be described. The management apparatus 2 manages AR content information regarding AR contents, and also transmits the AR content information to the information processing apparatus 1 as appropriate. The AR content information includes positional information regarding the display position of an AR content, correlation information between an AR content and an AR marker M, and so forth. Details of the AR content information will be described later.

Further, the management apparatus 2 manages later-described condition information, and also transmits condition information to the information processing apparatus 1. Though details of the condition information will be described later, the condition information is information indicating a condition regarding the workplace of the work corresponding to an AR marker. Also, the management apparatus 2 may perform monitoring regarding whether or not the worker who operates the information processing apparatus 1 is implementing the work. As a result of the monitoring, in a case of confirming inexecution of the work, the management apparatus 2 may inform this to the administrator.

Figure 5:
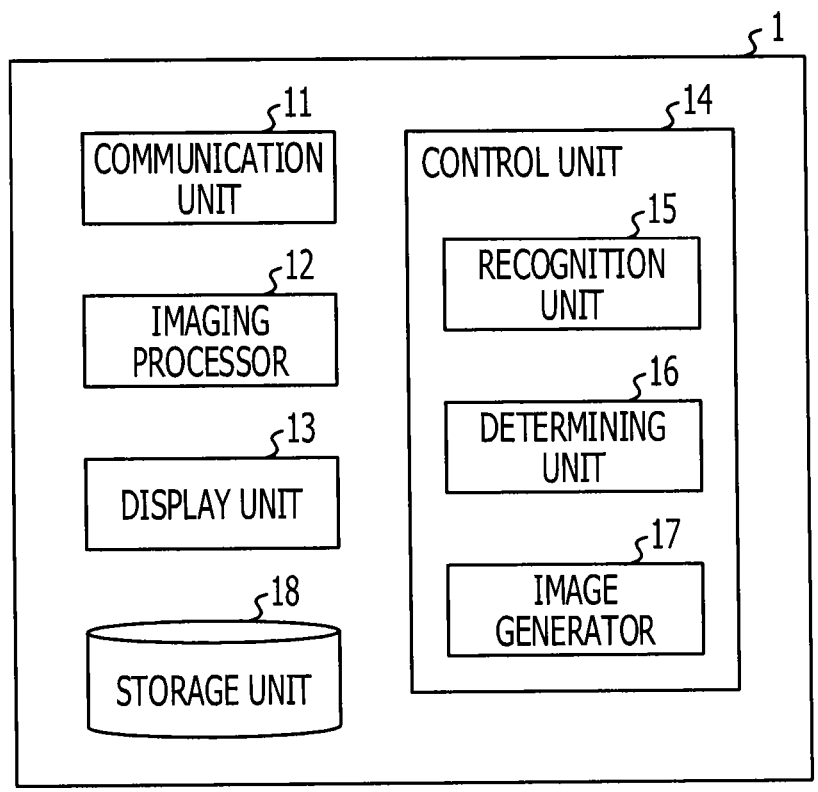
FIG. 5 is a function block diagram of an information processing apparatus according to a first embodiment.

Next, a functional configuration of the information processing apparatus 1 will be described. FIG. 5 is a function block diagram of the information processing apparatus 1 according to the first embodiment. The information processing apparatus 1 includes a communication unit 11, an imaging processor 12, a display unit 13, a control unit 14, and a storage unit 18. The communication unit 11 is a processor configured to perform communication with another device under control of the control unit 14. For example, the communication unit 11 receives the AR content information and condition information from the management apparatus 2.

The imaging processor 12 is a processor configured to acquire a photographed image in real space. The imaging processor 12 performs photographing at a certain frame interval or at timing specified by the control unit 14. The imaging processor 12 transmits image data equivalent to a photographed image to the control unit 14. The image data includes the luminance information and color information and so forth of each pixel. Also, an imaging apparatus such as a camera serving as the functions of the imaging processor 12 has to be communicable with the information processing apparatus 1, and does not have to be housed in the information processing apparatus 1.

The display unit 13 displays a photographed image or superimposed image under the control of the control unit 14. For example, the display unit 13 is a display.

The control unit 14 is a control unit configured to control various types of processing at the information processing apparatus 1. The control unit 14 is, for example, a processor. Specifically, the control unit 14 receives recognized information regarding recognition of a reference object included in an input image, and performs execution control of processing according to recognition of the reference object according to a condition regarding a photographed image of the input image. Also, the control unit 14 includes a recognition unit 15, a determining unit 16, and an image generator 17.

The recognition unit 15 recognizes an AR marker from the photographed image. Specifically, the recognition unit 15 extracts a partial image equivalent to an AR marker having a known shape from the image by object recognition processing. The recognition unit 15 analyzes the partial image to read recognition information of the AR marker. The recognition information of the AR marker is information for mutually identifying the AR markers, and will be referred to as marker ID below. The recognition unit 15 outputs recognized information regarding the recognition results to the determining unit 16. Note that the recognized information includes the identification information of an AR marker.

The determining unit 16 receives the recognized information regarding recognition of the reference object included in the input image, and performs execution control of processing according to recognition of the reference object according to a condition regarding the photographed position of the input image. For example, the determining unit 16 generates movement information regarding the photographed position of the input image when the recognition unit 15 recognizes a reference object such as an AR marker, and controls execution of generation processing and display processing of an AR content based on the movement information and the condition regarding the photographed position of the input image.

The movement information according to the present embodiment is information indicating difference between recognition time of a first AR marker and recognition time of a second AR marker. According to this difference, the photographed position of the input image including the second AR marker is estimated. This is because whether or not there has been movement from the photographed position of the first AR marker to the photographed position of the second AR marker may be estimated based on difference of recognition time. Also, photographed time when an image including an AR marker was photographed may be employed other than the recognition time of an AR marker.

The condition depends on at least one of time taken for movement from the workplace of work to be implemented in response to recognition of the first AR marker, to the workplace of work to be implemented in response to recognition of the second AR marker, and work time of work to be implemented in the workplace of the first AR marker by further photographing the first AR marker. For example, the condition may be to exceed time obtained by adding the movement time and the work time.

Also, the movement information may be difference between work start time and the recognition time of each AR marker. When difference between the work start time and the recognition time of each AR marker is employed as the movement information, the condition information is information depending on the movement time from the work start position to the workplace of work to be implemented in response to recognition of each AR marker, and the work time.

The determining unit 16 determines whether or not the movement information satisfies the condition information, and also performs execution control of processing corresponding to recognition of an AR marker according to whether or not the condition is satisfied. Comparing the movement information and the condition information enables whether or not work to be implemented in response to recognition of an AR marker, has been implemented, to be estimated. For example, when difference between the recognition time of the first AR marker and the recognition time of the second AR marker exceeds the time set in the condition, determination is made that the work has been implemented.

On the other hand, when the information processing apparatus 1 includes an acceleration sensor or gyro sensor, the movement information may be the path of movement from the photographed position of the first AR marker to the photographed position of the second AR marker. Specifically, the determining unit 16 generates the path of movement of the information processing apparatus 1 according to output from the sensor as the movement information.

In this case, information regarding the path of movement from the first AR marker to the second AR marker is set beforehand as the condition information. Accordingly, the determining unit 16 may determine whether or not the movement information satisfies the condition information according to a comparison result between the path in the movement information and the path in the condition information. When the two paths are similar, determination is made whether or not the movement information satisfies the condition information. Note that the determining unit 16 calculates a correlation value between the path of the movement information and the path of the condition information, and when the correlation value is equal to or greater than a threshold value, determines that both are similar. Note that description will hereinafter be continued in the present embodiment using an example in which implementation of work is determined using time.

The determining unit 16 controls generation of a superimposed image according to the determination result, for example. Note that, though a superimposed image is generated by the image generator 17, and thereafter displayed on the display unit 13, this means that a superimposed image is generated by the determining unit 16 commanding the image generator 17 to generate a superimposed image. In other words, no superimposed image is generated by the determining unit 16 suppressing the image generator 17 from receiving a command for generating a superimposed image.

For example, when a superimposed image including the projection image of an AR content corresponding to a certain AR marker M is not displayed, this does not allow the worker to comprehend work contents. Accordingly, for example, the worker is not allowed to leave a suitable description in a check list. The administrator who confirms the check list may then reprimand in one way or another a worker who has faked implementation of work.

On the other hand, there may be conceived a case where the worker already knows work contents, and fills in a check list or the like without depending on the display contents of an AR content. In order to handle this, the determining unit 16 generates history information regarding whether or not work has been implemented in a workplace where an AR marker is installed according to the determination result.

The history information is informed to the management apparatus 2 via the communication unit 11. For example, when determination is made that the movement information does not satisfy the condition information, history information to the effect that the work has not been implemented is generated. Note that log information including photographed time when an image including each AR marker was photographed, and so forth may be informed to the management apparatus 2 along with the history information. The log information will be described later.

The image generator 17 generates a superimposed image where an AR content projection image is disposed on a photographed image. Specifically, the image generator 17 displays an AR content which is model data of a three-dimensional object in a manner superimposed on a photographed image captured by the camera. Generation of a superimposed image will be described here.

The AR content is, for example, model data including multiple points. A texture and an image are set for every multiple faces obtained by interpolating multiple points with a straight line or curve, and a three-dimensional model is formed by the multiple faces being composed. In placement of the AR contents, the coordinates of each point making up the AR content are determined with a reference object existing within real space as a reference.

On the other hand, a positional relation in real space between the camera and the reference object is obtained based on the appearance (image) of the reference object reflected in a photographed image captured by the camera. The reference object is an object of which the shape and texture are known. What kind of position the reference object is in as to the camera is distinguished by matching between the image of the reference object and a known shape or texture, for example.

A positional relation between the camera and the coordinates of each point of the AR content is obtained by coordinates with the reference object as a reference, and a positional relation between the camera and the reference object. (Though the positional relation between the camera and the AR content is mentioned here, the AR content is a content virtually situated, so it is not true that an object which is the AR content exists in real space. Only information of a position with the camera as a reference is generated.) An AR content image (projection image) obtained when an AR content existing on virtual space is tentatively captured by the camera is generated based on these positional relations. Description will further be made regarding a calculation for generating an AR content projection image based on FIGS. 6, 7, 8, and 9.

Figure 6:
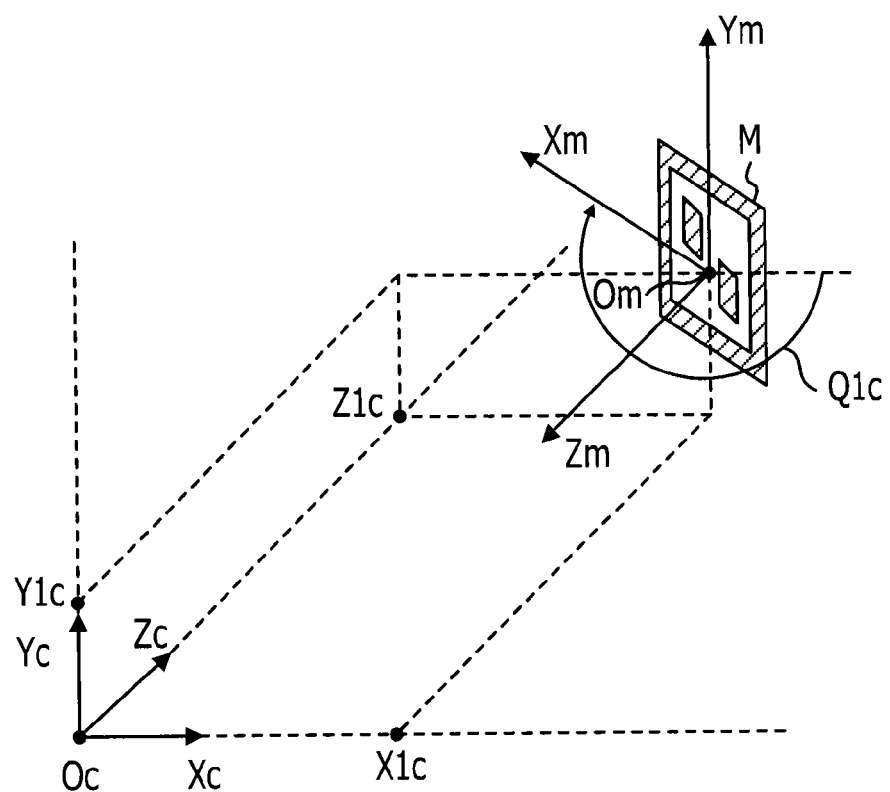
FIG. 6 illustrates a relation between a camera coordinate system and an AR marker coordinate system.

FIG. 6 illustrates a relation between the camera coordinate system and the AR marker coordinate system. The AR marker M illustrated in FIG. 6 is an example of the reference object used for AR content display. The AR marker M exemplified in FIG. 6 has a square shape of which the size is determined beforehand (e.g., the length of one side is 10 cm or the like). Though the AR marker M illustrated in FIG. 6 has a square shape, another reference object having a shape of which the relative position and direction from the camera is distinguishable may be employed, based on which viewpoint of multiple viewpoints the image has been captured. Another example of the reference object is a feature point to be generated from a photographed image, or the like.

The camera coordinate system is configured of three dimensions of (Xc, Yc, Zc). For example, the focal point of the camera is taken as the origin (origin Oc). Note that the camera is an example of the imaging apparatus included in the information processing apparatus 1 in the present embodiment. For example, Xc-Yc plane in the camera coordinate system is a plane parallel to the imaging device surface of the camera, and the Zc axis is an axis perpendicular to the imaging device surface.

The AR marker coordinate system is configured of three dimensions of (Xm, Ym, Zm). For example, the center of the AR marker M is taken as the origin (origin Om). For example, the Xm-Ym plane in the AR marker coordinate system is a plane parallel to the print surface of the texture of the AR marker M, and the Zm axis is an axis perpendicular to the print surface of the AR marker M. The origin Om is indicated by position coordinates V1c (X1c, Y1c, Z1c) in the camera coordinate system. Also, a rotation angle of the AR marker coordinate system as to the camera coordinate system is indicated by rotation coordinates G1c (P1c, Q1c, R1c). The P1c is a rotational angle around the Xc axis, the Q1c is a rotational angle around the Yc axis, and the R1c is a rotational angle around the Zc axis. Since the AR marker M exemplified in FIG. 6 rotates around the Ym axis alone, the P1c and R1c are 0.

Figure 7:
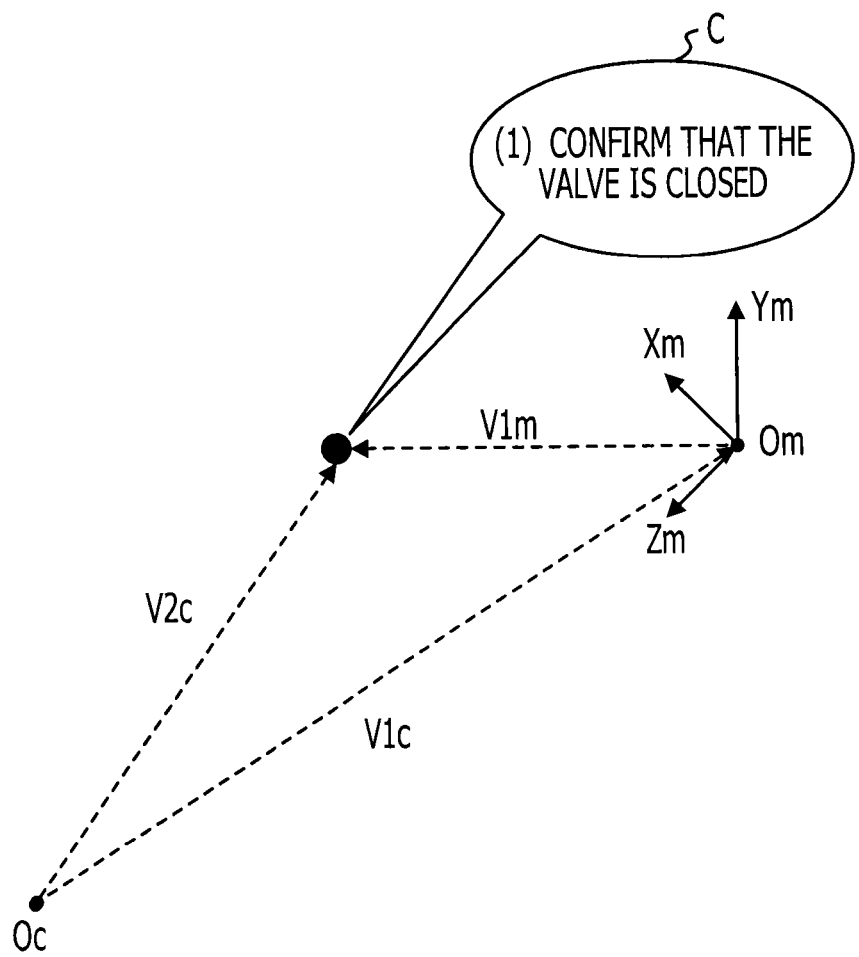
FIG. 7 illustrates an example of an AR content in the camera coordinate system and in the AR marker coordinate system.

FIG. 7 illustrates an example of an AR content C in the camera coordinate system and in the AR marker coordinate system. The AR content C exemplified in FIG. 7 is model data having a speech balloon shape, and includes text data to "(1) CONFIRM THAT VALVE IS CLOSED" within the speech balloon. A black circle in the tip of the speech balloon of the AR content C is taken as the reference point of the AR content C. Coordinates in the AR marker coordinate system of the reference point of the AR content C are taken as V1m (X1m, Y1m, Z1m). Further, the direction of the AR content C is determined by rotation coordinates G1m (P1m, Q1m, R1m), and the size of the AR content C is determined by a scale factor D1m (J1x, J1y, J1z).

The coordinates of each point making up the AR content C are coordinates obtained by the coordinates of each point defined in the template (AR template) of the AR content C being adjusted based on the coordinates V2m of the reference point, rotation coordinates G2m, and scale factor D1m. The coordinates of the reference point defined in the AR template are (0, 0, 0), for example. Each of the coordinates included in the AR template is adjusted by being rotated based on the rotation coordinates G1m that has been set, enlarged or reduced by the scale factor D1m, and moved in parallel based on the coordinates V1m of the reference point. The AR content C in FIG. 7 is in a state in which each point defined in the AR template is configured based on a point of the AR marker M adjusted based on the coordinates V1m of the reference point, rotation coordinates G1m, and scale factor D1m in the AR marker coordinate system.

The coordinates in the AR marker coordinate system of each point of the AR content C are transformed into those in the camera coordinate system, and further transformed into a position within a display screen (coordinates in the screen coordinate system) based on the coordinates in the camera coordinate system. A projection image of the AR content C is generated based on the transformed coordinates. The coordinates in the camera coordinate system are calculated by performing coordinate transform (model-view transform) based on the coordinates V1c and rotation coordinates G1c on the coordinates in the AR marker coordinate system. For example, upon the model-view transform being performed on the coordinates V2m, coordinates V2c (X2c, Y2c, Z2c) in the camera coordinate system of the reference point are obtained.

FIG. 8 illustrates a transform matrix E from the AR marker coordinate system to the camera coordinate system, and a rotation matrix R within the transform matrix E. The transform matrix E is a 4×4 matrix. A column vector (Xc, Yc, Zc, 1) is obtained by product between the transform matrix E and column vector (Xm, Ym, Zm, 1). The transform matrix E is calculated based on the position coordinates V1c (X1c, Y1c, Z1c) and rotation coordinates G1c (P1c, Q1c, R1c) of an AR marker in the camera coordinate system.

The column vector (Xc, Yc, Zc, 1) including point coordinates in the camera coordinate system is obtained by substituting the point coordinates in the AR marker coordinate system to be subjected to coordinate transform (model-view transform) for the column vector (Xm, Ym, Zm, 1) to perform matrix operation. Rotation operation for matching the direction in the AR marker coordinate system and the direction in the camera coordinate system is performed by a partial matrix in the first to third rows and also the first to third columns of the transform matrix E being applied to the coordinates in the AR marker coordinate system. Translation operation for matching the direction in the AR marker coordinate system and the positions in the camera coordinate system is performed by a partial matrix in the first to third rows and also the fourth column of the transform matrix E being applied to the coordinates in the AR marker coordinate system.

FIG. 9 illustrates rotation matrices R1, R2, and R3. The rotation matrix R illustrated in FIG. 8 is calculated by product between the rotation matrices R1, R2, and R3 (R1·R2·R3).

The coordinates (Xm, Ym, Zm) in the AR marker coordinate system of each point making up the AR content C are transformed into the coordinates (Xc, Yc, Zc) in the camera coordinate system by the model-view transform based on the transform matrix E. The position coordinates V2m exemplified in FIG. 7 is transformed into the position coordinates V2c by the model-view transform.

The screen coordinate system is configured of two dimensions of (Xs, Ys). For example, the center of a photographed image obtained by imaging processing of the camera is taken as the origin (origin Os). The coordinates in the camera coordinate system of each point of the AR content C are transformed into the screen coordinate system by transparent transform. A projection image of the AR content C is generated based on the coordinates in the screen coordinate system of each point obtained by transparent transform.

Coordinate transform (transparent transform) from the camera coordinate system to the screen coordinate system is performed based on the focal length f of the camera, for example. The Xs coordinate in the coordinates of the screen coordinate system corresponding to the coordinates (Xc, Yc, Zc) in the camera coordinate system is obtained by Xs=f·Xc/Zc. Also, the Ys coordinate in the coordinates of the screen coordinate system corresponding to the coordinates (Xc, Yc, Zc) in the camera coordinate system is obtained by Ys=f·Yc/Zc.

A projection image of the AR content C is generated based on position coordinates (screen coordinate system) obtained by the position coordinates (camera coordinate system) of each point making up the AR content C being subjected to transparent transform. Which point is interpolated to form a surface, and which texture (image) is mapped in which surface, are defined in the AR template serving as the source of the AR content C. The projection image of the AR content C is generated by texture or image being mapped on a surface obtained by interpolating each position coordinates (screen coordinate system) in accordance with the definition in the AR template.

Coordinates on a photographed image corresponding to the coordinates in the AR marker coordinate system are calculated by the above-described model-view transform and transparent transform, and the projection image of the AR content C according to the viewpoint of the camera is generated using the coordinates. Upon the projection image of the AR content C being composed on the photographed image, since this image is displayed on the screen as if there were a three-dimensional object, visual information to be provided to the user is expanded.

Also, the projection image of the AR content C may be displayed on a transmission type display as another example of AR content display. In this mode as well, since an image in real space obtained by the user transmitting the display is consistent with the projection image of an AR content, visual information to be provided to the user is expanded. The processing according to the present embodiment in which the projection image of an AR content, and a photographed image are composed and displayed, or the like may be processing in which an AR content is displayed when a transmission type display is employed.

Implementing the above processing on each AR content associated with an AR marker M generates a superimposed image where the projection image of an AR content is superimposed on a photographed image in real space. For example, when the recognition unit 15 has recognized the AR marker MA, the image generator 17 generates the superimposed image illustrated in FIG. 2.

Note that, when the determining unit 16 controls generation of a superimposed image by the image generator 17 according to the determination result, the image generator 17 generates a superimposed image in response to a command from the determining unit 16. On the other hand, in a case of an embodiment such that history information is generated according to the determination result, generation of a superimposed image by the image processor 17 does not receive the control by the determining unit 16, for example, when recognition by the recognition unit 15 is completed, the image processor 17 may automatically perform generation of a superimposed image.

Returning to FIG. 5, the storage unit 18 stores information used for various types of processing at the information processing apparatus 1. For example, the storage unit 18 stores AR content information, template information, condition information, and log information. Note that the control unit 14 controls acquisition of the AR content information, condition information, and so forth from the management apparatus 2, and also performs storage to the storage unit 18.

For example, the communication unit 11 acquires the AR content information, template information, and condition information from the management apparatus 2 at the time of the worker starting work (T=t0 in FIG. 1) under the control of the control unit 14. Next, the control unit 14 stores the AR content information, template information, and condition information in the storage unit 18.

Note that, in a case of having received input for starting work from the information processing apparatus 1, the management apparatus 2 specifies an AR content relating to this work, and provides AR content information of the specified AR content to the information processing apparatus 1. The management apparatus 2 also selects information relating the work regarding the template information and condition information, and provides this to the information processing apparatus 1.

FIG. 10 is a diagram illustrating a data structure example of an AR content information table. The AR content information table stores the AR content information. The AR content information includes a content ID, a marker ID, a template ID, position information, scale factor information, attached information, and so forth regarding each AR content.

The content ID is information for identifying each AR content. The marker ID is information for identifying each AR marker. The template ID is information for identifying a template. Note that the template is information in which the shape and texture of a three-dimensional model of an AR content to be displayed on a superimposed image is defined.

The position information is information relating to the disposed position and rotation of an AR content as to the reference object such as an AR marker or the like. Specifically, the position information includes position coordinates and rotation coordinates in the AR marker coordinate system. The scale factor information is information for defining enlargement or reduction of a three-dimensional model following the template. The attached information is information attached to each AR content. Examples of the attached information include text information to be displayed on a three-dimensional model following the template.

In FIG. 10, for example, the AR content of content ID "C1" is associated with the AR marker of marker ID "MA", and is represented by a three-dimensional model certain in template ID "T1". Also, the AR content of content ID "C1" is disposed on a photographed image according to a positional relation between the camera and AR marker based on the position coordinates (X1m, Y1m, Z1m), rotation coordinates (P1m, Q1m, R1m), and scale factor (J1x, J1y, J1z). Further, the AR content of content ID "C1" disposes text information of attached information "(1) CONFIRM THAT VALVE IS CLOSED" on the three-dimensional model following the template ID "T1".

FIG. 11 illustrates a data structure example of a template information table. The template information table stores the template information. The template information includes the template ID of an AR template, coordinate data T11 of each vertex making up the AR template, and surface structure data T12 of each surface making up the AR template. The information of each surface included in the surface structure data includes specifications of a vertex order that is the order of vertexes making up the surface, and a texture ID. The texture ID indicates the identification information of a texture to be mapped on the surface (the identification information of an image file). Examples of the reference point of an AR template include the 0'th vertex.

Now, upon the recognition unit 15 recognizing the AR marker corresponding to the marker ID "MA" in the photographed image acquired from the imaging processor 12, the image generator 17 uses the AR content information in FIG. 10 and the template information in FIG. 11 to generate a superimposed image 200 such as FIG. 2.

Specifically, the image generator 17 performs the model-view transform and transparent transform, whereby the AR content equivalent to the content ID "C1" is disposed on the photographed image as a projection image 204. Similarly, the AR content corresponding to template ID "C2" is disposed as a projection image 205, and the AR content corresponding to template ID "C3" is disposed as a projection image 206. Thus, the superimposed image 200 is generated.

FIGS. 12 and 13 illustrate a data structure example of a condition information table. The condition information is information regarding a workplace. For example, there is certain a time condition regarding movement from the workplace of work to be implemented in response to recognition of the first AR marker to the workplace of work to be implemented in response to recognition of the second AR marker as the condition information.

A first example illustrated in FIG. 12 is a condition information table that stores the condition information when the work order is certain regarding a plurality of work to be implemented by reading each AR marker. On the other hand, a second example illustrated in FIG. 13 is a condition information table that stores the condition information when the work order is not certain regarding a plurality of work to be implemented by reading each AR marker.

First, in the case of the first example, the condition information table stores a recognized marker ID, an immediately prior recognized marker ID, and a time condition, in a correlated manner. The recognized marker ID is the identification information of an AR marker recognized from a photographed image. The immediately prior recognized marker ID is the identification information of an AR marker recognized one ahead of recognition of a recognized marker ID.

The time condition is information regarding a condition that difference between recognized time when the AR marker of the recognized marker ID was recognized, and recognized time when the AR marker of the immediately prior recognized marker ID was recognized has to satisfy. Note that examples of the recognized time of the AR marker include photographed time of a photographed image.

For example, in the case of the example in FIG. 12, when the recognized marker ID is "MA", the immediately prior recognized marker is "Null". This indicates that the AR marker of marker ID "MA" has to be recognized first. In FIG. 1, the worker is determined to visit the room 101 and to implement work corresponding to reading of the AR marker "MA".

Also, in the case of the example in FIG. 12, the immediately prior recognized marker ID "MA" is associated with the recognized marker ID "MB". That is to say, it is certain that the AR marker of marker ID "MA" has to be recognized before recognizing the AR marker of marker ID "MB". Further, a time interval for recognizing the AR markers of the recognized marker ID "MB" and the immediately prior recognized marker ID "MA" is certain to be seven minutes. This value is a value set based on that it takes "seven minutes" as time for the worker implementing various types of work in accordance with the superimposed image (FIG. 2) displayed by reading the AR marker MA of the immediately prior recognized marker ID "MA", and movement time from the workplace of the AR marker MA to the workplace of the AR marker MB. Note that only a lower limit value of a time interval to be satisfied as a condition is certain in the example in FIG. 12. That is to say, when difference in the recognized time is included in a range of equal to or greater than this lower limit value, determination is made that the condition is satisfied.

Note that the time condition may be certain by a range indicated with the lower limit value and upper limit value. In this case, regarding a case where an image is captured with equal to or longer than the time interval specified by the time condition as well, implementation control of processing corresponding to recognition of an AR marker may be performed.

Next, in the case of the second example, the time conditions of the condition information table are set for each combination between a recognized marker ID and an immediately prior recognized marker ID regarding multiple AR markers relating to work of which the work order has not been certain. For example, the AR marker of recognized marker ID "MD" is an AR marker relating to work of which the work order is not certain, which is comprehended from the fact that the recognized marker ID "MD" is set to the condition information table in FIG. 13.

Further, in a case of having recognized the AR marker of recognized marker ID "MD", when the immediately prior recognized marker ID is "MC", the time condition is "ten minutes". Also, when the immediately prior recognized marker ID is "ME", the time condition is "three minutes". Further, when the immediately prior recognized marker ID is "MF", the time condition is "ten minutes".

FIGS. 12 and 13 may be used together. Specifically, as illustrated in FIGS. 12 and 13, the marker ID of each AR marker M is set to a recognized marker ID in one entry of the condition information table. Thus, there is distinguished a case where ordering is provided to between various types of work to be implemented by reading each AR marker, and a case where no ordering is provided.

For example, when the marker IDs "MA", "MB", and "MC" relate to work to which ordering has to be provided, these marker IDs are set to the condition information table illustrated in FIG. 12. On the other hand, when the marker IDs "MD", "ME", and "MF" relate to work to which ordering does not have to be provided, these marker IDs are set to the condition information table illustrated in FIG. 13.

Also, a different condition may be set to the condition information illustrated in FIGS. 12 and 13 for each worker. For example, the time condition is increased or decreased as to a reference according to the years of experience or properties of the worker. Time obtained by subtracting a certain proportion of time from the reference time condition illustrated in FIGS. 12 and 13 is used as the time condition regarding a worker having many years of experience.

Also, an AR content to be associated with a certain AR marker may be switched depending on work contents or workers in the AR technology. For example, when there are a check work A and a check work B in the same facility, AR content information for check work A, and AR content information for check work B, and condition information are generated beforehand. The management apparatus 2 provides the AR content information and condition information according to the work contents specified by the worker to the information processing apparatus 1. Thus, the information processing apparatus 1 may perform suitable determination according to various types of work.

FIG. 14 is a diagram illustrating a data structure example of a log information table. The log information table stores log information. The log information stores a marker ID and recognized time in a correlated manner. Note that logs relating to another operation may also be stored together.

The status in FIG. 14 illustrates that the AR marker of marker ID "MA" was recognized at recognized time "13:00:00 May 1, 2013". Each time another AR marker is recognized, recognized time is stored in a manner associated with the marker ID.

For example, first, at the time of the AR content information from the management apparatus 2 being acquired, the control unit 14 sets a marker ID included in the AR content information to the item of the marker ID in the management information table. Note that, each time the recognition unit 15 recognizes an AR marker, the marker ID of the recognized AR marker may be stored in the log information table.

Figure 15:
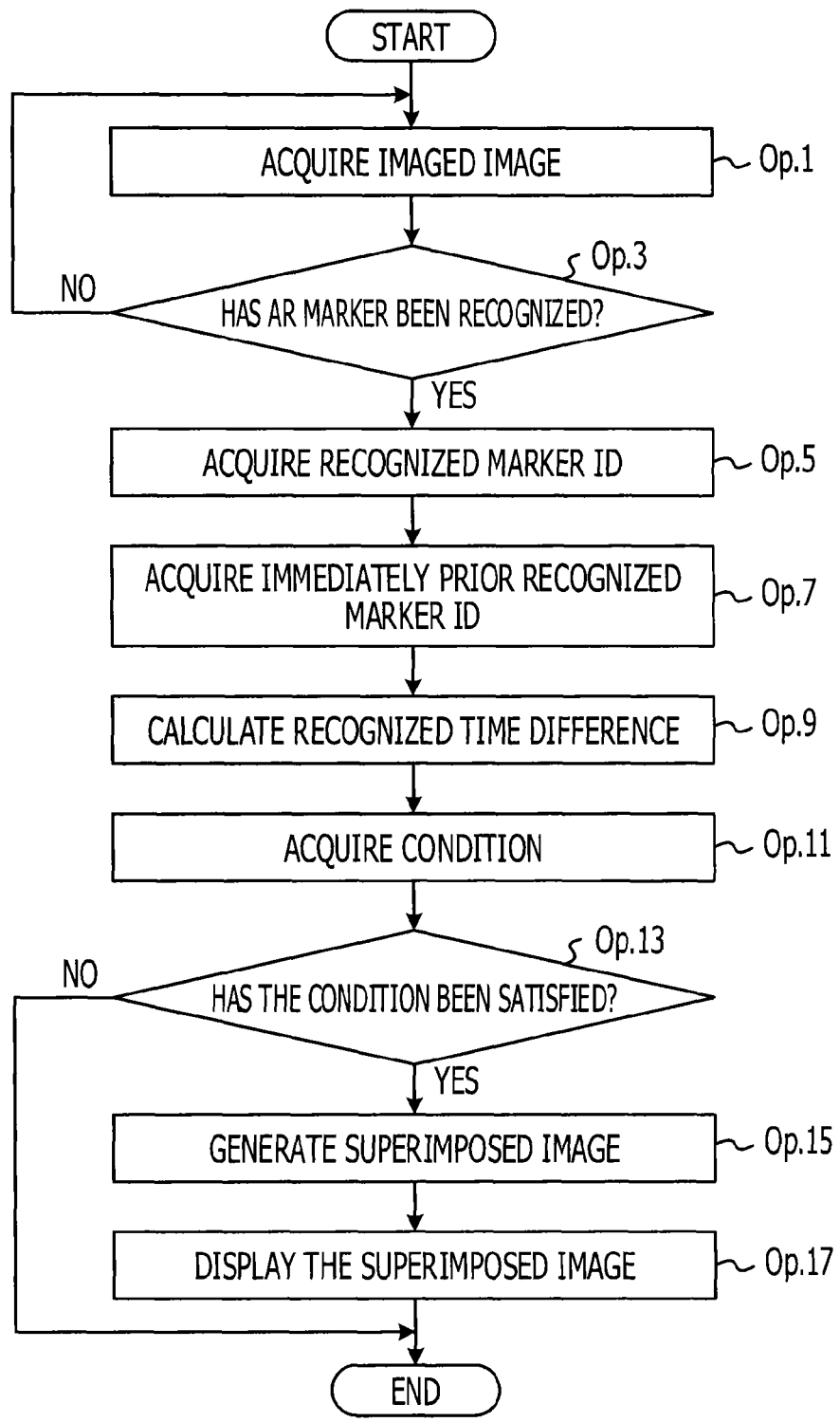
FIG. 15 is a processing flowchart of a determination method.

Next, a detailed processing flow will be described regarding the determination method according to the information processing apparatus 1. FIG. 15 is a processing flowchart of the determination method. Note that the communication unit 11 acquires various types of information illustrated in FIGS. 10 to 13 from the management apparatus 2, and stores these in the storage unit 18 prior to the processing illustrated in FIG. 15 in the present embodiment.

First, the recognition unit 15 acquires a photographed image (Op. 1). Note that the recognition unit 15 acquires the photographed image photographed by the imaging processor 12. Next, the recognition unit 15 executes AR marker recognition processing on the photographed image to determine whether to have recognized an AR marker (Op. 3). For example, when a certain shape is included in the photographed image, the recognition unit 15 determines that the photographed image is an image including an AR marker, and further analyzes the image of the AR marker portion to recognize the AR marker.

When no AR marker has been recognized (No in Op. 3), the flow returns to Op. 1. On the other hand, when an AR marker has been recognized (Yes in Op. 3), the determining unit 16 acquires a recognized marker ID which is the recognition result by the recognition unit 15, as recognized information (Op. 5). Now, the determining unit 16 stores the recognized time in the log information table in a manner associated with the same marker ID as the recognized marker ID.

Now, in order to suppress erroneous recognition of an AR marker, the recognition unit 15 may acquire multiple photographed images, and implement AR marker recognition on the multiple photographed images. For example, the recognition unit 15 implements AR marker recognition on each of 10 photographed images, and generates a final recognition result with reference to each of the recognition results. For example, the recognition unit 15 takes a marker ID having the maximum number of times of recognition of the marker IDs recognized from the photographed images, as a final recognition result.

Next, the determining unit 16 acquires an immediately prior recognized marker ID having recognized time closest to the recognized time of the recognized marker ID with reference to the log information table (Op. 7). Further, the determining unit 16 also acquires the recognized time of the immediately prior recognized marker ID.

The determining unit 16 calculates difference between the recognized time of the recognized marker ID and the recognized time of the immediately prior recognized marker ID (Op. 9). Specifically, the determining unit 16 generates movement information regarding the photographed position of the photographed image including the reference object (AR marker).

Next, the determining unit 16 acquires condition information regarding the recognized marker ID and immediately prior recognized marker ID with reference to the condition information table (Op. 11). For example, time conditions regarding the recognized marker ID and immediately prior recognized marker ID are acquired from either of the two condition information tables in FIGS. 12 and 13.

Next, the determining unit 16 determines whether or not the difference of the recognized time satisfies the time condition (Op. 13). Specifically, the determining unit 16 may determine whether or not work corresponding to the recognized reference object has been implemented based on whether or not the movement information satisfies the condition information.

For example, determination is made regarding whether or not the difference in the recognized time is equal to or greater than the time condition. Also, when the difference in the recognized time is a value within an upper or lower several percentages of the time certain in the time condition, the determining unit 16 may determine that the difference in the recognized time satisfies the time condition.

When the difference in the recognized time satisfies the time condition (Yes in Op. 13), the image generator 17 receives the determination result by the determining unit 16 to generate a superimposed image (Op. 15). Note that generation of a superimposed image is as described above. Next, the display unit 13 displays the superimposed image under the control of the image generator 17 (Op. 17). Thus, the information processing apparatus 1 ends the determination method. On the other hand, when the difference in the recognized time does not satisfy the time condition (No in Op. 13), the information processing apparatus 1 ends the determination method.

Also, the following processing may be performed regarding the processing in Op. 13 and thereafter. For example, the determining unit 16 generates history information relating to implementation of the work according to the determination result in Op. 13. Specifically, when the difference in the recognized time satisfies the time condition (Yes in Op. 13), the determining unit 16 generates history information indicating that the work has been implemented. On the other hand, when the difference in the recognized time does not satisfy the time condition (No in Op. 13), the determining unit 16 generates history information indicating that the work has not been implemented.

Note that history information may be generated only when the difference in the recognized time satisfies the time condition (Yes in Op. 13). Note that, regardless of the determination result in Op. 13 in the embodiment for generating history information, the image generating unit 17 may generate a superimposed image, or in the same way as Op. 17, generation of a superimposed image may be controlled in accordance with generation of history information.

Now, when the information processing apparatus 1 is communicable with the management apparatus 2, the communication unit 11 may be controlled to transmit the history information to the management apparatus 2. When the information processing apparatus 1 is incommunicable with the management apparatus 2, history information to be transmitted to the control unit 14 and management apparatus 2 may be generated, and at the time of going into a communicable state, the communication unit 11 may be controlled to transmit the history information to the management apparatus 2. Note that the log information may be transmitted along with the history information.

As described above, the information processing apparatus 1 disclosed in the present embodiment may distinguish whether or not work to be implemented in response to reading of the reference object has been implemented in a certain workplace based on the movement information and condition information. Further, the information processing apparatus 1 may perform determination regarding implementation of the work by acquiring the AR content information, condition information, and template information from the management apparatus 2 beforehand. For example, even when the workplace is in a state incommunicable with the management apparatus 2, suitable determination may be performed regarding implementation of the work.

Also, it is difficult for the worker to comprehend the next work contents in a mode for controlling generation and display of a superimposed image in response to the determination result. Accordingly, it is difficult for the worker to fill in a suitable check result in a check list or the like, for example. Accordingly, fraud is comprehended by the administrator.

Further, execution or inexecution is determined regarding a worker who knows the work contents as well, in a mode for generating history information in response to the determination result. The administrator may comprehend fraud by transmitting the history information to the management apparatus 2.

Also, when there is ordering in the work, determination regarding implementation of the work may be performed by adding ordering, and accordingly, more accurate determination may be performed.

Second Embodiment

An embodiment has been described in the first embodiment in which the information processing apparatus 1 acquires the AR content information, condition information, and template information from the management apparatus 2. Description will be made in a second embodiment regarding a mode in which determination regarding implementation of work is performed in collaboration with an information processing apparatus 3 and a management apparatus 4.

Figure 16:
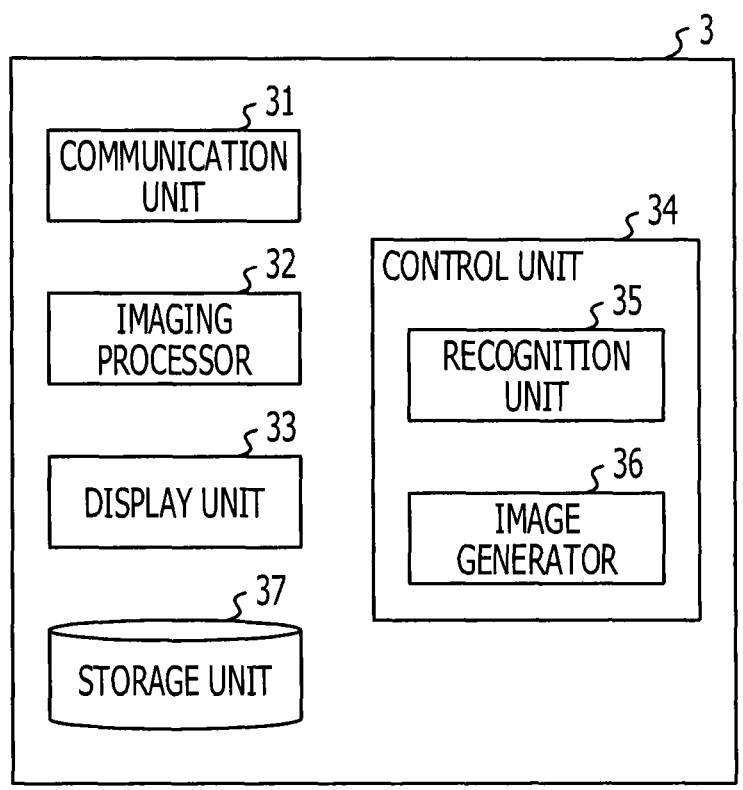
FIG. 16 is a function block diagram of an information processing apparatus according to a second embodiment.

First, a function configuration of an information processing apparatus according to the present embodiment will be described. FIG. 16 is a function block diagram of the information processing apparatus according to the second embodiment. The information processing apparatus 3 includes a communication unit 31, an imaging processor 32, a display unit 33, a control unit 34, and a storage unit 37. Note that the communication unit 31, imaging processor 32, and display unit 33 perform the same processing as the communication unit 11, imaging processor 12, and display unit 13 in the first embodiment.

The control unit 34 controls the entire processing of the information processing apparatus 3. The control unit 34 is realized by a processor, for example. The control unit 34 includes a recognition unit 35 and an image generator 36.

The recognition unit 35 performs recognition of an AR marker in the same way as that in the first embodiment. Next, the recognition unit 35 transmits a request for AR content information to the management apparatus 4 via the communication unit 31. The request for AR content information includes the recognized marker ID and recognized time. The communication unit 31 receives a response as to the request for AR content information from the management apparatus 4.

The response includes the AR content information, and template information used for drawing of this AR content. Note that the management apparatus 4 generates movement information as described later, and determines whether to enable the AR content information to be provided based on the movement information and condition information.

Upon the communication unit 31 receiving the response, the image generator 36 generates a superimposed image in the same way as that in the first embodiment. Note that the response includes the AR content information and template information corresponding to the recognized marker ID. Next, the image generator 36 displays the generated superimposed image on the display unit 33.

The storage unit 37 does not have to hold a plurality of AR content information and template information beforehand unlike the first embodiment. That is to say, the storage unit 37 temporarily stores the AR content information and template information included in the response from the management apparatus 4. Further, the storage unit 37 does not have to hold the condition information. This is because determination using the condition information is executed at the management apparatus 4. Note that the storage unit 37 may hold the log information in the same way as that in the first embodiment, or does not have to hold the log information.

Figure 17:
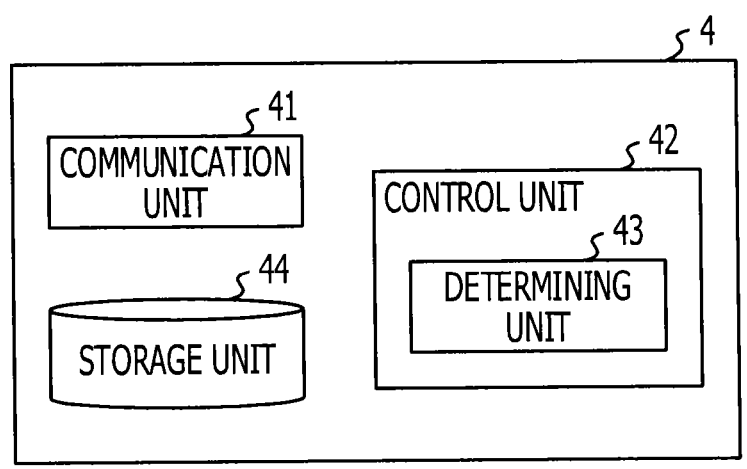
FIG. 17 is a function block diagram of a management apparatus according to the second embodiment.

Next, the function configuration of the management apparatus 4 will be described. FIG. 17 is a function block diagram of the management apparatus according to the second embodiment. The management apparatus 4 includes a communication unit 41, a control unit 42, and a storage unit 44.

The communication unit 41 is a processor configured to perform communication with the information processing apparatus 3. For example, the communication unit 41 receives a request for AR content information, or under the control of the control unit 42, transmits a response as to the request, for example. The control unit 42 controls the entire processing of the management apparatus 4. Further, the control unit 42 includes a determining unit 43.

The determining unit 43 generates movement information based on recognized time included in the request for AR content information. Next, the determining unit 43 determines whether or not the generated movement information satisfies the condition information, thereby determining whether or not the work has been implemented by a worker who possesses the information processing apparatus 3.

Next, the determining unit 43 controls execution of processing according to the determination result. For example, when determination is made that the movement information satisfies the condition, the determining unit 43 transmits a response including the AR content information and template information to the information processing apparatus 3 via the communication unit 41. On the other hand, when determination is made that the movement information does not satisfy the condition information, the determining unit 43 transmits warning information to the effect that the work has not been implemented to the administrator.

The storage unit 44 stores the AR content information, template information, condition information, and log information according to each information processing apparatus. Note that each information is the same as that in the first embodiment.

As described above, according to the present embodiment, implementation of work may be determined in collaboration between the information processing apparatus 3 and management apparatus 4. The information processing apparatus 3 does not have to hold information such as the AR content information and so forth at the storage unit 37. Thus, the information processing apparatus 3 may reduce the storage region in comparison with that in the first embodiment.

Third Embodiment

An example in which the present technology is applied to work support using the AR technology has been described in the first and second embodiments. However, the present technology is not restricted to this. For example, the present technology may be applied to a management system such that an IC tag is installed in each workplace, an IC tag reader reads the IC tag in each workplace, thereby managing implementation of work of a worker who possesses the reader.

An information processing apparatus acquires read time of when the reader has read each IC tag, and so forth. Note that the information processing apparatus may be a reader, or a computer which is communicable with the reader. Next, the computer determines implementation of work in the same way as that in the previous embodiments based on movement information generated from the read time, and condition information. According to the present embodiment, fraud due to a faked IC tag may be detected.

Fourth Embodiment

In a case of a mode in which determination regarding implementation of work is performed in a collaboration between an information processing apparatus and a management apparatus, the information processing apparatus may have the functions of the determining unit, and the management apparatus may have the functions of the recognition unit and image generator.

Specifically, the information processing apparatus transmits a captured image to the management apparatus. The recognition unit and image generator in the management apparatus recognizes the reference object, and also generates a superimposed image. Next, the management apparatus transmits the superimposed image to the information processing apparatus. After receiving the superimposed image, the determining unit of the information processing apparatus determines whether or not the superimposed image is displayed on the display unit based on the movement information and condition information. In a case of satisfying the condition, the display unit of the information processing apparatus displays the superimposed image. On the other hand, in a case of not satisfying the condition, the display unit does not display the superimposed image.

Hardware Configuration Example

Figure 18:
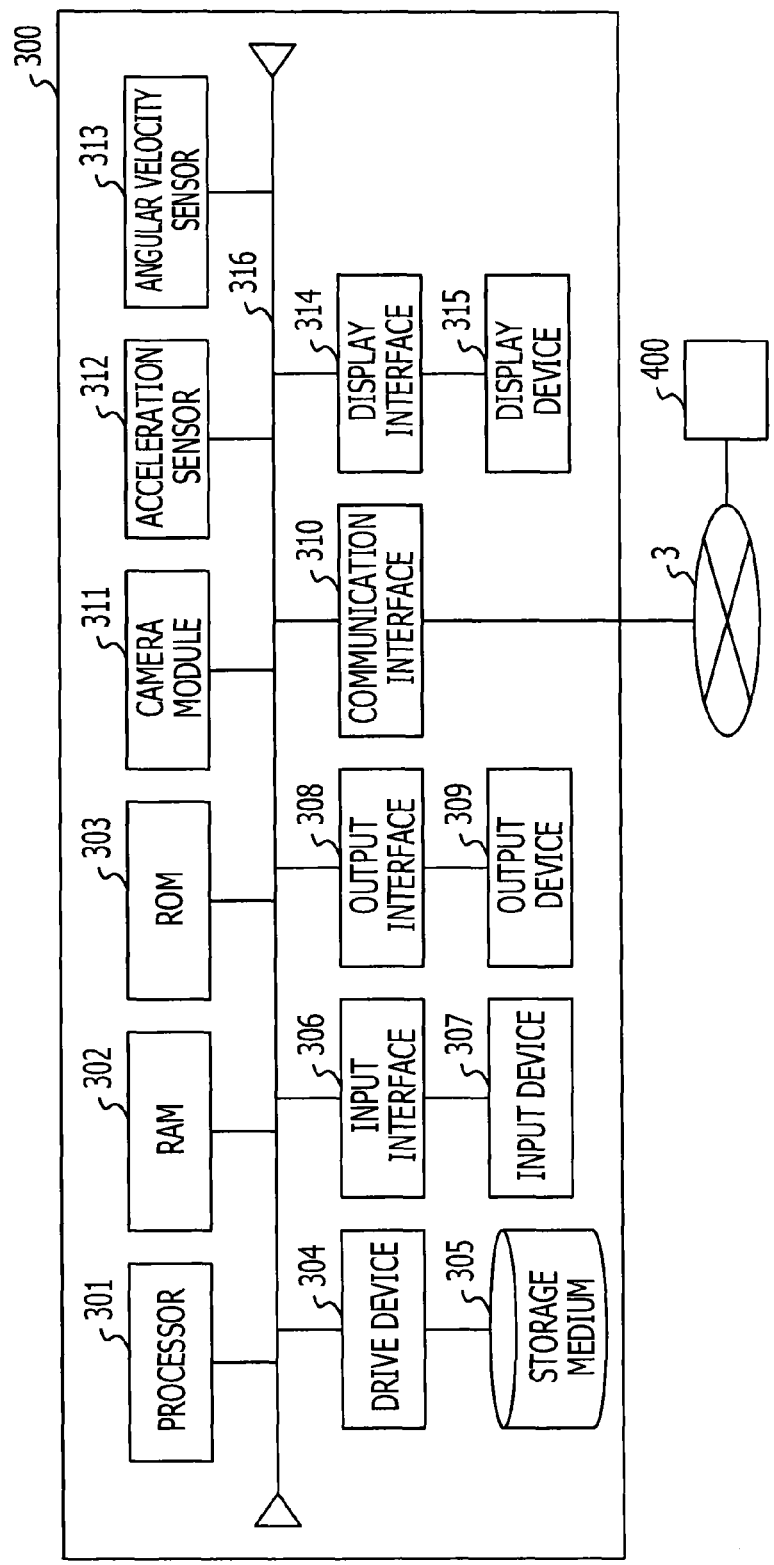
FIG. 18 is a hardware configuration example of the information processing apparatuses according to the embodiments.

Description will be made regarding the hardware configurations of the information processing apparatus 1 described in the first embodiment, and the information processing apparatus 3 described in the second embodiment. FIG. 18 is a hardware configuration example of the information processing apparatuses according to the embodiments. The information processing apparatuses according to the embodiments are realized by a computer 300. Note that the information processing apparatuses described in the third and fourth embodiments may also be realized by the computer 300 illustrated in FIG. 18.

The function blocks illustrated in FIGS. 5 and 16 are realized by the hardware configuration illustrated in FIG. 18. The computer 300 includes, for example, a processor 301, random access memory (RAM) 302, read only memory (ROM) 303, a drive device 304, a storage medium 305, an input interface 306, an input device 307, an output interface 308, an output device 309, a communication interface 310, a camera module 311, an acceleration sensor 312, an angular velocity sensor 313, a display interface 314, a display device 315, a bus 316, and so forth. Each hardware component is connected via the bus 316.

The communication interface 310 performs control of communication via a network N. The communication controlled by the communication interface 310 may have a mode to access the network N via a wireless base station using wireless communication. The input interface 306 is connected to the input device 307, and transmits an input signal received from the input device 307 to the processor 301. The output interface 308 is connected to the output device 309, and causes the output device 309 to execute output corresponding to instructions from the processor 301.

The input device 307 is a device configured to transmit an input signal according to operations. Examples of the input device 307 include a key device such as a keyboard, buttons attached to the main unit of the computer 1, or the like, and a pointing device such as a mouse, a touch panel, or the like. The output device 309 is a device configured to output information according to the control of the processor 301. Examples of the output device 309 include an audio output device such as a speaker or the like.

The display interface 314 is connected to the display device 315. The display interface 314 causes the display device 315 to display image information written in a display buffer provided to the display interface 314 by the processor 301. The display device 315 is a device configured to output information according to the control of the processor 301. Examples of the display device 315 include an image output device such as a display or the like, and a transmission type display.

In a case of the transmission type display being employed, the projection image of an AR content may be controlled so as to be displayed in a suitable position within the transmission type display instead of being composed with a photographed image, for example. Thus, the user obtains visual sensation in a state in which the AR content is consistent with real space. Also, for example, an input and output device such as a touch screen or the like is employed as the input device 307 and display device 315. Also, instead of the input device 307 and display device 315 being built into the computer 1, the input device 307 and display device 315 may externally be connected to the computer 1.

The RAM 302 is a readable and writeable memory device. Examples of the RAM 302 include semiconductor memory such as static RAM (SRAM) or dynamic RAM (DRAM) or the like, and flash memory other than RAM. The ROM 303 includes programmable ROM (PROM) and so forth.

The drive device 304 is a device configured to perform at least one of readout or writing of information stored in the storage medium 305. The storage medium 305 stores information written by the drive device 304. Examples of the storage medium 305 include a hard disk, a solid state drive (SSD), a compact disc (CD), a digital versatile disc (DVD), and Blu-ray Disc (registered trademark). Also, the computer 1 includes the drive device 304 compatible with the kind of the storage medium 305 within the computer 1.

The camera module 311 includes an imaging device (image sensor), and is configured to read out a value measured by the imaging device, and to write this in an image buffer for input images included in the camera module 311. The acceleration sensor 312 measures acceleration to be applied to the acceleration sensor 312. The angular velocity sensor 313 measures angular velocity of operation by the angular velocity sensor 313.

The processor 301 reads a determining program stored in the ROM 303 or storage medium 305 to the RAM 302, and performs processing in accordance with the procedure of the read program.

Figure 19:
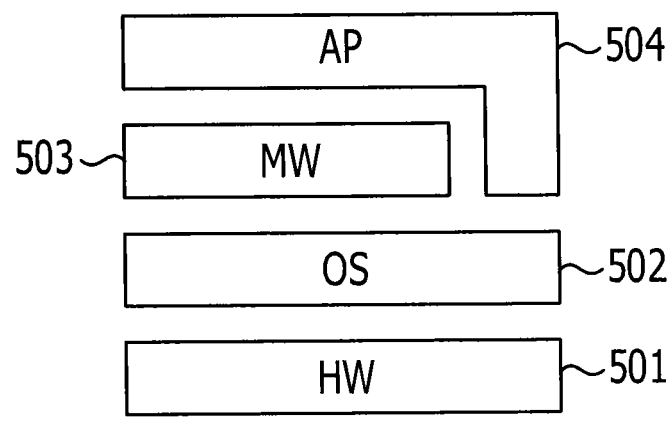
FIG. 19 illustrates a structure example of a program that runs over a computer.

For example, the functions of the control units 14 and 34 are realized by the processor 301 performing control of other hardware based on an AR control program (including a determining program) which is part of the program illustrated in FIG. 19. The functions of the communication units 11 and 31 are realized by the processor 301 controlling the communication interface 310 to execute data communication, and to store received data in the storage medium 305.

The functions of the storage units 18 and 37 are realized by the ROM 303 and storage medium 305 storing a program file and a data file, and the RAM 302 being employed as a work area of the processor 301. For example, the AR content information and so forth are stored in the RAM 302.

The functions of the imaging processors 12 and 32 are realized by the camera module 311 writing image data in the image buffer for input images, and the processor 301 reading out the image data within the image buffer for input images. The image data is, in a monitoring mode, written in the image buffer for input images, and also written in the display buffer of the display device 315 in parallel, for example.

Also, the functions of the display units 13 and 33 are realized by the processor 301 writing the generated image data in the display buffer provided to the display interface 314, and the display device 315 performing display of the image data within the display buffer.

FIG. 19 illustrates a configuration example of a program which runs on a computer 300. An operating system (OS) 502 configured to perform control of a hardware group illustrated in FIG. 18 runs on the computer 300. Processing by an application program 504 or middleware 503 is realized on the hardware 501 by the processor 301 operating in procedures in accordance with the OS 502 to perform control and management of the hardware 501.

The programs such as the OS 502, middleware 503, and application program 504 are read to the RAM 302 and executed by the processor 301 at the computer 300, for example. Also, the AR control program is a program to be called up from the application program 504 as the middleware 503, for example. Alternatively, the AR control program including a determining program is a program for realizing the AR function as the application program 504, for example. The AR function program is stored in the storage medium 305. The storage medium 305 may be distributed separately from the computer 300 main unit storing the determining program according to the present embodiment as a standalone program, or a state in which the AR control program including the determining program is stored.

Figure 20:
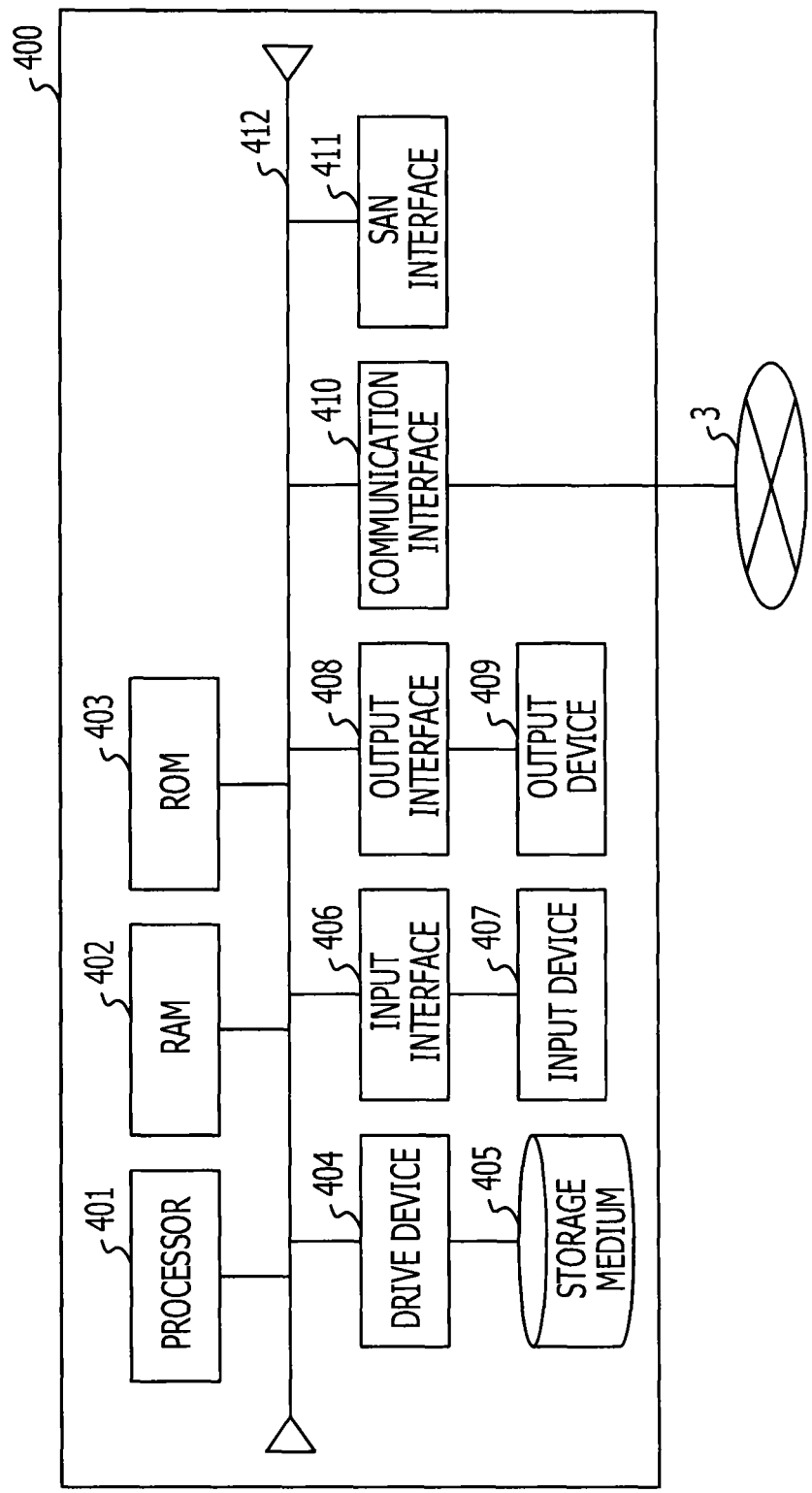
FIG. 20 is a hardware configuration example of the management apparatuses according to the embodiments.

The hardware configuration of the management apparatus 4 described in the second embodiment will be described. FIG. 20 is a hardware configuration example of the management device. The management apparatus 4 is realized by a computer 400. Note that the management apparatus 2 disclosed in the first embodiment is also realized by the computer 400 illustrated in FIG. 20.

The function blocks illustrated in FIG. 17 are realized by the hardware configuration illustrated in FIG. 20, for example. The computer 400 includes, for example, a processor 401, RAM 402, ROM 403, a drive device 404, a storage medium 405, an input interface 406, an input device 407, an output interface 408, an output device 409, a communication interface 410, a Storage Area Network (SAN) interface 411, a bus 412, and so forth. Each hardware component is connected via the bus 412.

For example, the processor 401 is hardware similar to the processor 301. The RAM 402 is hardware similar to the RAM 302, for example. The ROM 403 is hardware similar to the ROM 303, for example. The drive device 404 is hardware similar to the drive device 304, for example. The storage medium 405 is hardware similar to the storage medium 305, for example. The input interface 406 is hardware similar to the input interface 306, for example. The input device 407 is hardware similar to the input device 307, for example. The output interface 408 is hardware similar to the output interface 308, for example. The output device 409 is hardware similar to the output device 309, for example. The communication interface 410 is hardware similar to the communication interface 310, for example. The storage area network (SAN) interface 411 is an interface for connecting the computer 400 to the SAN, and includes a host bus adapter (HBA).

The processor 401 reads a management program stored in the ROM 403 or storage medium 405 to the RAM 402, and performs the processing of the control unit 42 in accordance with the procedure of the read management program. At this time, the RAM 402 is employed as a work area of the processor 401. Note that the management program includes the determining program according to determination processing at the management apparatus 4.

The functions of the storage unit 44 are realized by the ROM 403 and storage medium 405 storing a program file and a data file, or the RAM 402 being employed as a work area of the processor 401. Also, the functions of the communication unit 41 are realized by the processor 401 controlling the communication interface 410 to perform communication processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory, the processor configured to: acquire first image data;
   detect a reference image of a particular object from the first image data;
   store first time information indicating a first time when the first image data including the reference image is captured;
   acquire second image data;
   detect another reference image of another particular object from the second image data;
   store second time information indicating a second time when the second image data including the another reference image is captured;
   generate difference information that indicates a time difference between the first time and the second time based on the first time information and the second time information;
   determine whether the difference information satisfies a time interval condition;
   generate history' information, when the difference information satisfies the time interval condition, indicating that a user has implemented an action in a place where the action has to be implemented, the action resulting in a change of state of the particular object, and output the history information; and
   generate another history information, when the difference information does not satisfy the time interval condition, indicating that the user has not implemented the action in the place where the action has to be implemented, and output the another history information,
   wherein the first image data is captured at a first place, and
   the second image data is captured at a second place different from the first place.

2. The information processing apparatus according to claim 1, wherein
   the another particular object has a certain shape, and
   the processor is further configured to superimpose content image data associated with the another particular object on the second image data when the difference information satisfies the time interval condition.

3. The information processing apparatus according to claim 1, wherein the processor is configured to determine that the action is implemented in the place when the difference information is included in a certain range corresponding to the time interval condition.

4. The information processing apparatus according to claim 2, wherein the content image data is superimposed and displayed when the difference information satisfies the time interval condition.

5. The information processing apparatus according to claim 1, wherein
   the place is an environment where a management apparatus configured to manage the information processing apparatus is incommunicable with the information processing apparatus, and
   the time interval condition is transmitted from the management apparatus to the information processing apparatus in another environment where the information processing apparatus is communicable with the management apparatus.

6. The information processing apparatus according to claim 1, wherein the particular object and the another particular object each include a surface on which a texture where identification information for identifying the particular object is mapped or printed.

7. A determination method executed by a processor, the method comprising:
   acquiring first image data;
   detecting a reference image of a particular object from the first image data;
   storing first time information indicating a first time when the first image data including the reference image is captured;
   acquiring second image data;
   detecting another reference image of another particular object form the second image data;
   storing second time information indicating a second time when the second image data including the another reference image is captured;
   generating, by the processor, difference information that indicates a time difference between the first time and the second time based on the first time information and the second time information:
   determining, by the processor, whether the difference information satisfies a time interval condition;
   generating history' information, when the difference information satisfies the time interval condition, indicating that a user has implemented an action in a place where the action has to be implemented, the action resulting in a change of state of the particular object, and outputting the history information; and
   generating another history information, when the difference information does not satisfy the time interval condition, indicating that the user has not implemented the action in the place where the action has to be implemented, and outputting the another history information,
   wherein the first image data is captured at a first place, and
   the second image data is captured at a second place different from the first place.

8. The determination method according to claim 7, wherein
   the another particular object has a certain shape, and
   the determination method further comprises superimposing content image data associated with the another particular object on the second image data when the difference information satisfies the time interval condition.

9. The determination method according to claim 7, wherein the action is determined to be implemented in the place when the difference information is included in a certain range corresponding to the time interval condition.

10. The determination method according to claim 8, wherein the content image data is superimposed and displayed when the difference information satisfies the time interval condition.

11. The determination method according to claim 7, wherein
the place is an environment where a management apparatus configured to manage an information processing apparatus including the processor is incommunicable with the information processing apparatus, and
the time interval condition is transmitted from the management apparatus to the information processing apparatus in another environment where the information processing apparatus is communicable with the management apparatus.

12. The determination method according to claim 7, wherein the particular object and the another particular object each include a surface on which a texture where identification information for identifying the particular object is mapped or printed.

13. The information processing apparatus according to claim 1, wherein the processor determines that the action is performed based on detection of the particular object and the another particular object.

14. The information processing apparatus according to claim 1, wherein the processor determines whether the user has implemented the action based on the difference information, the time interval condition, detection of the particular object and detection of the another particular object.

15. The determination method according to claim 7, further comprising:
determining that the action is performed based on detection of the particular object and the another particular object.

16. The determination method according to claim 7, wherein the determining whether the user has implemented the action is based on the difference information, the time interval condition, detection of the particular object and detection of the another particular object.

17. A non-transitory computer readable medium storing computer executable instructions which, when executed by a computer including a memory and a processor, cause the computer to:
acquire first image data;
detect a reference image of a particular object from the first image data;
store first time information indicating a first time when the first image data including the reference image is captured;
acquire second image data;
detect another reference image of another particular object from the second image data;
store second time information indicating a second time when the second image data including the another reference image is captured;
generate difference information that indicates a time difference between the first time and the second time based on the first time information and the second time information;
determine whether the difference information satisfies a time interval condition;
generate history information, when the difference information satisfies the time interval condition, indicating that a user has implemented an action in a place where the action has to be implemented, the action resulting in a change of state of the particular object, and output the history information;
and generate another history' information, when the difference information does not satisfy the time interval condition, indicating that the user has not implemented the action in the place where the action has to be implemented, and output the another history information,
wherein the first image data is captured at a first place, and the second image data is captured at a second place different from the first place.

* * * * *